Feb. 2, 1937. D. D. PEEBLES 2,069,389

METHOD FOR SEPARATING SUBSTANCES FROM GASEOUS MEDIUMS

Filed Aug. 3, 1934

INVENTOR
David D. Peebles
BY Paul D. Flehr
ATTORNEY

Patented Feb. 2, 1937

2,069,389

UNITED STATES PATENT OFFICE 2,069,389

METHOD FOR SEPARATING SUBSTANCES FROM GASEOUS MEDIUMS

David D. Peebles, Eureka, Calif.

Application August 3, 1934, Serial No. 738,241

5 Claims. (Cl. 183—120)

This invention relates generally to methods for the removal or separation of various substances from gaseous mediums. The invention has useful application where it is desired to recover a substance carried by the gaseous medium, as well as to treatment for the purification of gases.

It is an object of the invention to provide a method of the above character which will be characterized by great simplicity and efficiency, and which will have wide application to various gases and substances carried thereby.

A further object of the invention is to effect removal of substances from gaseous mediums where present forms of separating methods are not applicable, as for example, where extremely fine solid particles or fumes, as from sublimed material, are suspended in a gas.

Further objects of the invention will appear from the following description in which the preferred embodiment of the invention has been set forth in detail in conjunction with the accompanying drawing.

Referring to the drawing.

Figures 1, 2:
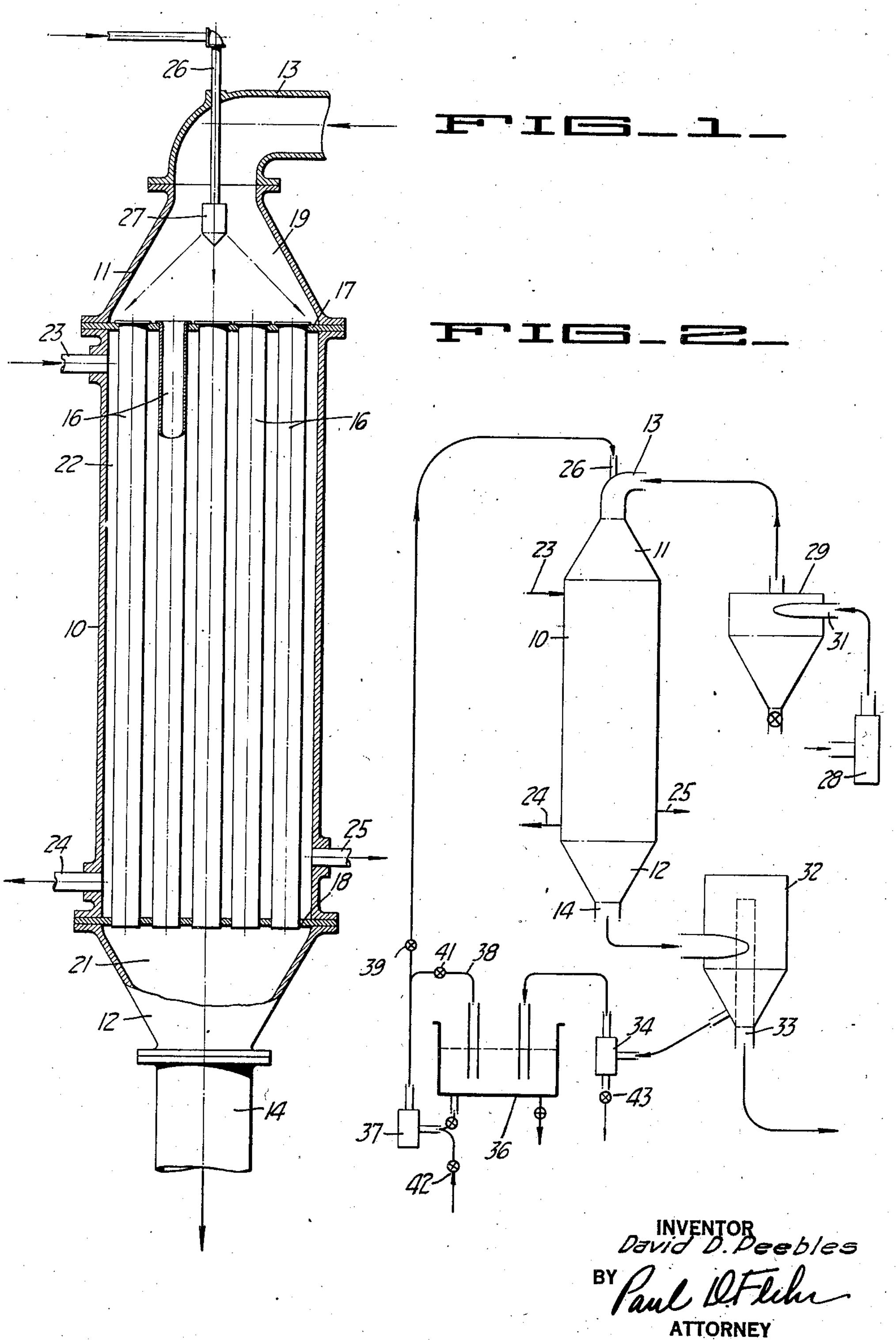
Fig. 1 is a side elevational view, in cross-section, illustrating a separating apparatus incorporating the present invention.
Fig. 2 is a diagrammatic view, illustrating further equipment which can be utilized with the apparatus of Fig. 1, for the removal of various substances from a gaseous medium.

The method incorporated in the present invention can be made clear after a description of the apparatus illustrated in the drawing. Referring first to Fig. 1, the apparatus consists of a casing 10, having end portions 11 and 12 to which the inflow and outflow conduits 13 and 14 are connected. Within the casing 10 are the elongated, open-ended tubes 16, through which the gas being treated is caused to flow. The ends of the tubes 16 extend through and are sealed with respect to the tube sheets 17 and 18. Thus, the ends of the tubes are in communication with an inflow header chamber 19 and an outflow header chamber 21.

In operation, I transmit heat through the walls of the tubes 16; therefore the space 22 surrounding the tubes is shown communicating with pipe 23, through which steam can be introduced. Pipe 24 communicating with the lower portion of chamber 22 is for the removal of condensate, steam, or both. Pipe 25 is indicated for the removal of non-condensable gases which may be carried in by the steam. In place of steam, other heating mediums can be employed, such as hot gases. Extending into the inflow chamber 19 there is a pipe 26, adapted to be connected to a suitable source of liquid under pressure, and the inner end of this pipe is provided with a suitable spray head 27.

Fig. 2 shows representative additional equipment incorporating the apparatus of Fig. 1. It will be noted that inflow conduit 13 is connected to the exhaust side of a cyclone separator 29, the inlet of which is connected to the discharge side of blower 28. The gaseous medium to be treated is supplied to the inflow side of blower 28 and is discharged to apparatus 10 after a preliminary removal of solids in separator 29. The outflow conduit 14 is connected to the separator 32. From this separator the gas, from which liquid phase material has been removed, is withdrawn through conduit 33, while liquid phase material is withdrawn by pump 34. The discharge from pump 34 leads to a liquid storage tank 36, from which liquid is withdrawn by pump 37 for redelivery to the spray pipe 26. A portion of the discharge from pump 37 can be re-discharged into tank 36 by way of line 38, and a control of the rate of supply of liquid to the spray pipe 26 can be afforded by manipulation of valves 39 and 41. Liquid can be introduced and removed as indicated by lines 42 and 43.

To explain the mode of operation of the apparatus described above, and the carrying out of my method, it will be presumed that the gas supplied to the separator 29 is discharged from milk-desiccating equipment, and contains finely-divided particles of desiccated milk in suspension. Such gas may be air, or products of combustion, dependent upon the drying gas used in the desiccating equipment. It will also be presumed that the liquid in tank 36, being pumped to the spray pipe 26, is milk, although water or other liquids can be employed. In passing through the separator 29, the coarser solid particles are removed, and the gas, which still retains the finer solid particles in suspension, is then delivered into the chamber 19 by blower 28. Within chamber 19 the gas is contacted with spray particles of milk and is then blown through the tubes 16, together with particles of liquid milk entrained therewith. The liquid particles carried into the tubes 16 suffice to keep the inner walls continually wet, and, by virtue of the heat being transmitted through the walls of the tubes, a portion of the particles is converted to the vapor phase. Therefore, in each of the tubes milk exists in both liquid and vapor phases, the vapor phase being produced particularly by vaporization of the liquid film with which the inner walls are being kept continually wet. The rate of gas flow through each of the tubes is made sufficient to cause a relatively high degree of turbulence. This turbulence causes continual impacting of liquid particles upon the inner walls and a continual whipping away of liquid so deposited, and it also thoroughly intermingles the flow of material. Whipping off of liquid is further aided because of heat transfer through the walls of the tubes, which causes vapor formation. Turbulence also serves to disperse the vapor throughout the gas stream, so as to afford a uniformly thorough influence upon the separating action.

The peculiar conditions existing within the tubes 16, explained above, serve to effect a remarkably efficient separation of finely-divided solid material from the gas, and the entrainment of the same in the milk or like liquid phase material. Referring again to Fig. 2, milk or like liquid phase material is removed from the separator 32 by pump 34, and the gas, which has now been freed of finely-divided particles, is discharged through conduit 33.

With respect to the turbulent condition produced in the flow through tubes 16, is is evident that such an effect is dependent largely upon the rate of gas flow. Assuming the use of a tube having a predetermined internal diameter, and assuming also a given rate of heat transfer, the speed of movement of the gas through the tube should be sufficient so that the effect of turbulence predominates, as distinguished from a relatively quiescent flow. By way of example, I have secured good results by utilizing tubes having a length of about twelve feet and a diameter of two inches, with a gas velocity therethrough of about 2000 feet per minute. In general, the tubes should be relatively long compared to their internal diameters.

The formation of vapor from water or like material as it passes through the tubes 16 has a remarkable effect upon the efficiency of separation obtained. As is well known, water or like material, of itself, when contacted with a gaseous medium is not particularly effective in the removal of finely-divided solid particles. Due to certain reasons, such as surface tension or the existence of an electrical charge upon the particles, the particles appear to be actually repelled from the surface of water or like liquids. It is in recognition of this phenomenon that, in the past, apparatus for the removal of finely-divided solid particles from gases has utilized a surface or film of oil as an entrainment material. Apparently there is little, if any, repelling action between finely-divided solid particles and a film of oil, but the use of oil in a separator of this character is subject to many disadvantages. For example, oil does not lend itself to the recovery of the removed solid particles, such as is frequently desirable where the finely-divided solid material is of value. Furthermore, the use of oil may impart to the gas objectionable hydrocarbon vapors.

In my method, it is possible to utilize water or like liquids as distinguished from oil, because the partial vaporization of the water to effect supersaturation, and the consequent reduction of vapor to saturation, in effect nullify any reluctance of the solid particles to be entrained by the water. The supersaturation phenomenon can be explained by stating that vaporization of a part of the liquid passing through the tubes causes supersaturation of the gas with respect to the liquid. Under such conditions, dust particles and other matter from the gas are entrained by fog, the fog being subsequently entrained in the unvaporized liquid and gas and tending to condense about dust particles to form small drops. In any event, a remarkably complete separation is obtained for a relatively short time period of treatment, and the separation is effective with respect to fumes such as sublimed material, and gases soluble in water such as sulphur-dioxide, as well as to dust particles.

In a commercial installation my invention may require a certain amount of adjustment in order to secure the separation desired, dependent upon the conditions of operation. For example, in one installation, where the gas being treated contained finely-divided particles of desiccated milk, the gas, upon delivery through the conduit 13, was at a temperature of 70° F. Incidentally, note that the temperature of this gas has little effect upon operation of the apparatus. Water was delivered to the spray head 27 at a flow rate of about 15 gals. per minute, for a flow of gas corresponding to about 50 cubic feet per second. The steam chamber 22 was maintained at a vacuum of about 19 inches of mercury, and the gas leaving conduit 14 was at a temperature of about 108° F. Where the gas being delivered through conduit 13 consisted largely of products of combustion from a fuel gas burner and contained considerable sulphur-dioxide, upon removal through conduit 33 the gas was free from all sulphur-dioxide and dust, and was odorless.

It is evident that my method and apparatus is capable of many variations within the spirit of the invention. For example, while atomization of the liquid is desirable to facilitate commingling with the gas, it is possible to supply the tubes with streams of liquid, properly controlled and distributed as to flow, whereby the liquid streams are disrupted within the tubes by turbulent flow and vaporization.

I claim:

1. In a method of effecting separation of substances from a gaseous medium where a stream of the gaseous medium is caused to flow through a passage together with a vaporizable liquid, causing heat to be imparted to the liquid while in the passage to cause the gaseous medium within the passage to be supersaturated with respect to its content of vapor from the liquid, and then separating liquid material from said gaseous medium after discharge thereof from said passage to thereby separate constituents agglomerated by condensation of vapor.

2. In a method of effecting separation of substances from a gaseous medium where a stream of the gaseous medium is caused to flow through a passage together with a vaporizable liquid, causing heat to be imparted to the liquid in said passage to cause the gaseous medium within the passage to be supersaturated with respect to its content of vapor from the liquid, the flow through the passage being at a sufficient velocity to cause turbulence and intermixing of the gas with the liquid and vapor, and then separating liquid material from said gaseous medium after discharge thereof from said passage to thereby separate constituents agglomerated by condensation of vapor.

3. In a method of removing substances from a substantially non-condensable gaseous medium, characterized by the use of an elongated passageway having heat-conducting walls, the steps of causing the gaseous medium to flow through said passageway with sufficient velocity to cause turbulence, simultaneously introducing into the passageway vaporizable liquid material, causing a heat transfer through the walls of said passageway to convert a portion of said liquid material to the vapor phase, and to supersaturate the gaseous medium within the passageway, and then effecting a removal of liquid material from said gaseous medium after discharge thereof from said passageway.

4. In a method of removing substances from a gaseous medium, characterized by the use of an elongated passageway having heat-conducting walls, the steps of causing the gaseous medium to flow through said passageway with sufficient velocity to cause turbulence, contacting the gaseous medium with liquid spray particles before introduction of the same into said passageway, whereby liquid spray particles are carried into said passageway together with the gaseous medium, causing a heat transfer through the walls of said passageway to convert a portion of the liquid material to the vapor phase, whereby conditions of supersaturation are maintained within the passageway, and effecting a removal of liquid phase material from the gaseous medium after discharge thereof from said passageway.

5. In a method of effecting a removal of substances from a substantially non-condensable gaseous medium, the steps of passing the gaseous medium through a passageway at sufficient velocity to cause turbulence, simultaneously introducing into the passageway a vaporizable liquid material, applying sufficient heat to the liquid material while within the passageway to afford heat for partial vaporization of the same and to cause supersaturation of the gaseous medium, and effecting a separation of liquid phase material from the gaseous medium after discharge thereof from said passageway.

DAVID D. PEEBLES.